Dec. 22, 1959
C. C. HENDRICKSON
2,918,300
CASTER WHEEL ASSEMBLY FOR A DISC TILLER
Filed Jan. 31, 1958
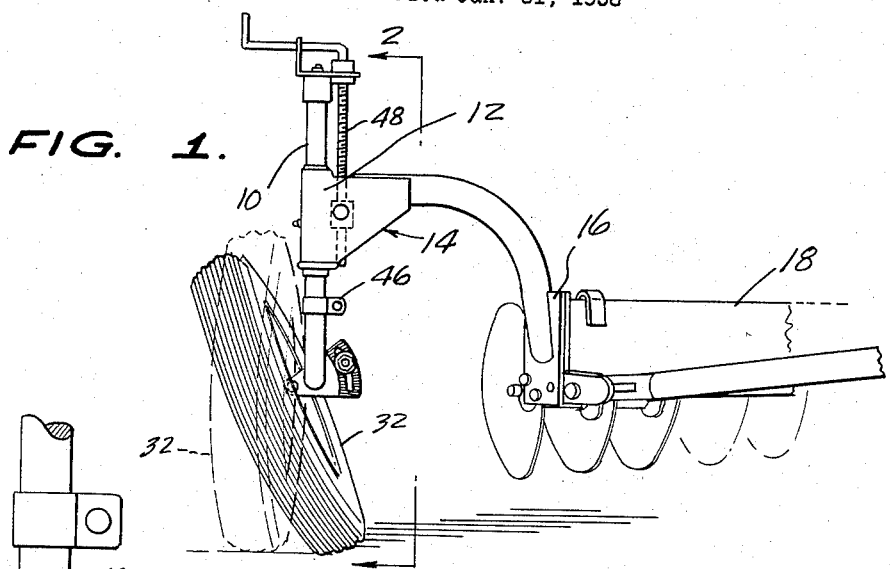
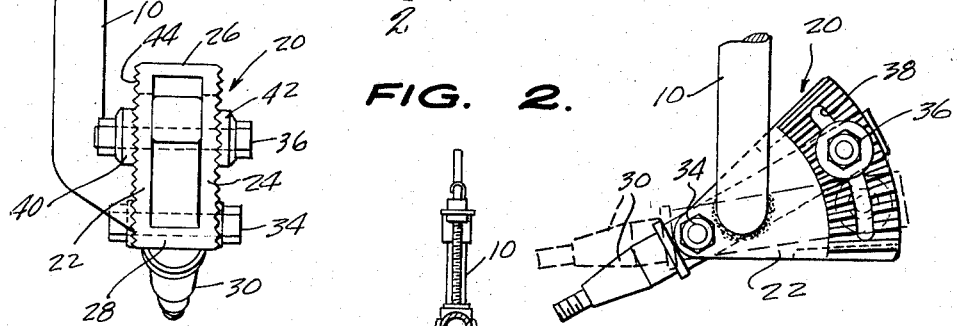
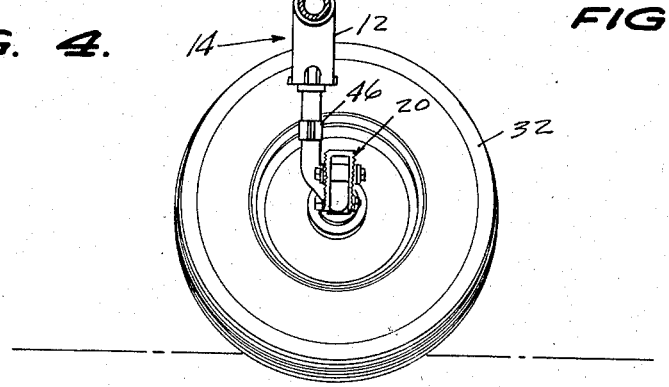
INVENTOR.
CHARLES C. HENDRICKSON,
BY
McMorrow, Berman & Davidson
ATTORNEYS.

United States Patent Office 2,918,300
Patented Dec. 22, 1959

2,918,300

CASTER WHEEL ASSEMBLY FOR A DISC TILLER

Charles C. Hendrickson, Turner, Mont.

Application January 31, 1958, Serial No. 712,529

3 Claims. (Cl. 280—80)

The present invention relates to a caster wheel assembly for a disc tiller.

An object of the present invention is to provide a caster wheel assembly for a disc tiller which is self-aligning when in a furrow and on a ground surface and one which provides side thrust for resisting lateral movement of the tiller when the discs of the tiller engage the ground surface.

Another object of the present invention is to provide a caster wheel assembly for a disc tiller in which the wheel may be set at a tilted angle to the vertical for engaging the wall of a furrow or may be set in a vertical position for travel over a ground surface.

A further object of the present invention is to provide a caster wheel assembly for a disc tiller which enables the operator of a towing vehicle to back the tiller into an enclosure and to make short right and left turns.

A still further object of the present invention is to provide a caster wheel assembly for a disc tiller which is simple in structure, one sturdily constructed, and one economically feasible.

These and other objects and advantages of the present invention will be fully apparent from the following description when taken in conjunction with the annexed drawings, in which:

Figure 1 is an elevational view of a portion of a disc harrow or tiller with the caster wheel assembly of the present invention installed thereon, the dotted line showing indicating the tilted movement position of the wheel of the assembly;

Figure 2 is an elevational view partially in section taken on the line 2—2 of Figure 1;

Figure 3 is a fragmentary view of the support member and stub axle with a portion of the spindle broken away, the dotted line showing the tilted position of the stub axle; and Figure 4 is a fragmentary elevational view of the assembly shown in Figure 3, showing the stub axle in the downwardly sloping position.

Referring in greater detail to the drawings in which like numerals indicate like parts throughout the several views, the caster wheel assembly of the present invention comprises an upstanding spindle 10 which extends through a socket 12 extending vertically in a wheel mounting designated generally by the reference numeral 14, the wheel mounting 14 being positioned outwardly of and spaced from an end piece 16 of a disc tiller frame 18.

An axle supporting member, designated generally by the reference numeral 20, embodying a pair of upstanding plates 22 and 24 arranged in tandem spaced relation and a connector 26 connecting the upper ends of the plates together and a connector 28 connecting the lower ends of the plates together, is positioned on one side of and transversely of the spindle 10 adjacent the lower end of the spindle 10 and is fixedly attached by welding or other means to the lower end of the spindle 10, the lower end portion of the spindle 10 being shown in Figure 4 as being attached to the plate 22.

An upwardly sloping stub axle 30 is mounted in the axle supporting member 20 so that the portion adjacent one end is received between the plates 22 and 24 with the portion adjacent the other end projecting outwardly and downwardly of the plates 22 and 24, as shown in Figure 3.

An upwardly sloping tilted ground-engaging wheel 32 is carried on the outwardly projecting end portion of the axle 30. Means is provided connecting the portion of the axle 30 within the axle supporting member 20 for movement of the axle 30 about a horizontal axis from the position in which the wheel 32 is in the tilted position to a position in which the wheel is in a vertical position, the latter position being shown in Figure 1 in dotted lines. Specifically, this means includes a first bolt and nut assembly 34 traversing aligned holes provided in the plates 22 and 24 on one side of the spindle 10 and at the lower end of each of the plates 22 and 24. Another bolt and nut assembly 36, constituting a fastening element, extends through registering closed arcuately curved slots formed in the plates 22 and 24 outwardly of and on the other side of the spindle 10, as shown most clearly in Figure 3, the slot in the one plate 22 being designated by the reference numeral 38.

A pair of washers 40 and 42 are carried on the bolt of the bolt and nut assembly 36 outwardly of the plates 22 and 24, respectively, and are provided with transverse serrations on their inner faces engageable in mating grooves or serrations provided on the outer faces of the plates 22 and 24 as at 44 in Figure 4. The washers 40 and 42 together with the nut and bolt assembly 36 constitute a releasable fastening element extending through the plates 22 and 24 and the adjacent portion of the axle 30 for holding the axle in the position in which the wheel 32 has been moved to the position at an angle to the vertical position or in the vertical position as desired.

In use, the disc tiller, mounted upon the caster wheel assembly of the present invention, as shown in Figures 1 to 4, may be moved in a work position over a field with the wheel 32 in the position at an angle to the vertical, as shown in full lines in Figure 1, with the wheel engaging in a furrow in the conventional manner and freely castering about the spindle 10 as a caster axis, or the wheel 32 may be moved to the vertical position, as shown in dotted lines, for movement over a road surface. When this is to be accomplished the wheel 32 is shifted to the vertical position by releasing the bolt and nut assemblies 34 and 36, and shifting the axle 30 to the dotted line position, Figure 3, whereupon the assemblies 34 and 36 are again tightened up. A tongue member 46 is on the spindle 10 to prevent the spindle from rotating within the socket 12. Conventional elevating mechanism, as at 48 in Figure 1, is provided for raising or lowering the disc tiller frame 18 with respect to the ground surface when desired.

What is claimed is:

1. In a disc tiller, the combination with a frame having an end piece and a caster wheel mounting positioned outwardly of and spaced from said end piece and carried by said end piece, said mounting including a socket extending vertically therethrough, of a caster wheel assembly including an upstanding spindle extending through and rotatably supported in said socket, an axle supporting member arranged in an upwardly sloping direction positioned rearwardly of said spindle with the upper end adjacent the lower end of said spindle and the lower end outwardly of and below the lower end of said spindle and fixedly connected to the lower end of said spindle, a stub axle mounted in said supporting member so that the portion adjacent one end is received within said member with the portion adjacent the other end projecting outwardly of said member, a ground-engaging wheel arranged in an upwardly tilted direction positioned so that the upper portion is outwardly of said spindle and the lower portion is below and inwardly of the lower end of said spindle and carried by said stub axle, means connecting said one end axle portion to said member for pivotal movement of said axle from the position in which the lower portion of said wheel is below and inwardly of the lower end of said spindle to a position in which the lower portion of said wheel is outwardly of the lower end of said spindle and in vertical spaced relation with respect to said spindle, and releasable means extending through said member and said one end axle portion for holding said axle in the position said wheel has been moved to the position in which the lower portion of said wheel is outwardly of the lower end of said spindle and in vertical spaced relation with respect to said spindle.

2. The combination according to claim 1, in which said axle supporting member embodies a pair of upstanding plates arranged in tandem spaced relation and a connector joining the upper ends of said plates together, and said releasable means extends through the plates of said member and said one end axle portion.

3. The combination according to claim 1, in which said axle supporting member embodies a pair of upstanding plates arranged in tandem spaced relation and a connector joining the upper ends of said plates together, and said releasable means embodies a fastening element extending through closed slots formed in the plates of said member and said one end axle portion.

References Cited in the file of this patent
UNITED STATES PATENTS

| | | |
|---|---|---|
| 273,508 | Garst | Mar. 6, 1883 |
| 1,207,443 | Smith | Dec. 5, 1916 |
| 1,855,459 | Strandlund | Apr. 26, 1932 |
| 2,588,709 | Elliot | Mar. 11, 1952 |